United States Patent
Shaffer et al.

(10) Patent No.: US 6,657,965 B1
(45) Date of Patent: Dec. 2, 2003

(54) SYSTEM AND METHOD FOR ENHANCED ROUTING AND RESERVATION PROTOCOL

(75) Inventors: Shmuel Shaffer, Palo Alto, CA (US); William J. Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/212,513

(22) Filed: Dec. 15, 1998

(51) Int. Cl.[7] ............................................. H04L 12/26
(52) U.S. Cl. ...................... 370/238; 370/444; 370/468; 379/211.02
(58) Field of Search .................... 370/228, 238, 370/227, 237, 231, 355, 219, 468, 395.41, 230, 238.1, 235, 455, 351, 395.42, 352, 437, 395.53; 714/4; 379/211.02

(56) References Cited

U.S. PATENT DOCUMENTS

| | | | |
|---|---|---|---|
| 5,297,137 A | | 3/1994 | Ofek et al. .................... 370/60 |
| 5,825,772 A | | 10/1998 | Dobbins et al. ............ 370/396 |
| 5,832,196 A | * | 11/1998 | Croslin et al. ................. 714/4 |
| 6,011,780 A | * | 1/2000 | Vaman et al. ................ 370/237 |
| 6,047,006 A | * | 4/2000 | Brakefield et al. .......... 370/524 |
| 6,359,903 B1 | * | 3/2002 | Shimade et al. ............ 370/468 |
| 6,424,624 B1 | * | 7/2002 | Galand et al. .............. 370/231 |

OTHER PUBLICATIONS

Decentralized Network Connection Preemption Algorithms, Mohammad Peyravian and Ajay D. Kshemkalyani, Computer Networks and ISDN Systems 30 (1998) 1029–1043, 15 pages total.

* cited by examiner

Primary Examiner—Chi Pham
Assistant Examiner—Alexander O. Boakye

(57) ABSTRACT

A network node and a method of dynamically reconfiguring routes of established connections in a communications system operate to provide the optimal path for a new connection based on a priority status of the new connection. The optimal path is provided even when a communication link on the optimal path does not have a sufficient amount of available bandwidth to accommodate the new connection. The network node operates in conjunction with other network nodes in the system to reroute one or more established connections that have reserved bandwidth on a communication link on the optimal route and have a lower priority status than the new connection, thereby increasing the available bandwidth on the communication link to accommodate the new connection. The network node also performs conventional functions of a router. The network node and the method can be implemented in any communications system where information is transmitted in packets, blocks, frames or cells. The network node includes a reroute-signal generator, a network monitor and a reservation unit that operate with a CPU of the node to perform the rerouting operation.

11 Claims, 5 Drawing Sheets

SYSTEM AND METHOD FOR ENHANCED ROUTING AND RESERVATION PROTOCOL

TECHNICAL FIELD

The invention relates generally to communications networks and more particularly to a system and a method for routing data through multiple network nodes.

DESCRIPTION OF THE RELATED ART

Various communications systems require routing of voice and data packets, blocks, frames or cells (collectively referred to herein as "packets") through two or more network nodes via communication links to provide connectivity between sites that are located at different networks. In a sophisticated communications system, the nodes that provide the connectivity between the networks operate using a routing algorithm that allows prioritization of packets that are relayed through the nodes. For example, voice packets are typically placed ahead of data packets because the voice packets carry real-time information.

In addition to prioritization of packets, the nodes may be configured to monitor the topology of the system, including the status of the communication links. The link status information may include the operational state and the remaining available bandwidth for each communication link in the system. Using the link status information, the nodes compute routing paths to establish new connections. A reservation protocol may be utilized by the nodes to reserve bandwidth on one or more communication links that define the computed routing paths. Such reservation protocol may be necessary to guarantee space on each communication link along the routing paths. The computed routing paths may vary depending on routing parameters that are being utilized by a particular node. The routing parameters may include the number of hops, the amount of toll charge associated with the path, and the distance between the two connecting nodes.

In a normal packet traffic condition, the path chosen by a source node (i.e., the network node associated with a connection-originating network) may be the optimal path in accordance with the prescribed routing parameters. However, when a communication link in the optimal path is over-crowded with reservations of established connections, the source node may be forced to route the new connection through a less preferred path. A concern is that bandwidth of the over-crowded communication link may be depleted due to a number of low priority connections that have been previously routed through the now over-crowded communication link. The problem arises when the pending connection to be made is a high priority connection, such as a connection for voice data transmission. The connectivity resources of the system are not being utilized efficiently when the high priority connection must be routed through a less preferred path, because the optimal path is being utilized by the lower priority connections.

The problem will be further described with reference to FIG. 1. In FIG. 1, a prior art communications system 10 having networks 12, 14, 16 and 18 is shown. The networks 12–18 are illustrated as local area networks (LANs). However, the networks 12–18 can be other types of network, such as wide area networks (WANs) or metropolitan area networks (MANs). Each LAN 12–18 can support a number of sites that may be physically located in a confined area, such as an office building, a building complex or a campus. For simplification, only the LANs 12 and 18 are shown with a number of associated sites. The LAN 12 includes sites 20, 22 and 24. The LAN 18 includes sites 26, 28 and 30. At each site 20–30, a computer 32 and/or a telephone 34 may be connected to their respective network.

The LANs 12–18 are interconnected by communication links 36, 38, 40 and 42. The communication links 36, 38, 40 and 42 may be in a form of physical communication links, such as fiber optic cables, or in a form of wireless communication links. The communication links 36–42 provide connectivity between nodes 44, 46, 48 and 50. The communication link 36 connects the node 44 to the node 46. The communication link 38 connects the node 44 to the node 50. The communication link 40 connects the node 46 to the node 50. The communication link 42 connects the node 48 to the node 50. The nodes 44–50 may be gateways, switches or routers having prioritizing and routing capabilities. However, the nodes 44–50 are identified in FIG. 1 as routers. Each router 44–50 is associated with one of the LANs 12, 14, 16 and 18. The router 44 is associated with the LAN 12, while the router 46 is associated with the LAN 14. The router 48 is associated with the LAN 16, whereas the router 50 is associated with the LAN 18.

The above-described problem may arise in the following manner. Initially, the packet traffic on the communication links 36–42 is light and much of the bandwidth on each of the links is available. One of the sites at LAN 12, for example the site 20, may request a data connection to another site at LAN 18, for example the site 26. Assuming that the optimal path for the data connection from LAN 12 to LAN 18 is through the communication link 38, the router 44 responds to the request by reserving the required bandwidth on the communication link 38. As additional data connections are made through the communication link 38, the available bandwidth on the communication link 38 may be down to 5% of its capacity. The established connections through the communication link 38 may include many data connections that have a lower priority than voice connections. At such time, a site at LAN 12, for example the site 24, requests a voice connection to a site at LAN 18, for example the site 28. This voice connection requires 10% of the total bandwidth of the communication link 38. When this request is received by the router 44, the router 44 has no choice except to route the voice connection through the communication links 36 and 40 via the router 46 due to lack of sufficient bandwidth remaining on the communication link 38, even though the optimal path is through the communication link 38.

The compulsory routing of the voice connection through the router 46 can have a negative effect on the packet traffic at the router 46. Since the voice connection has a high priority, the router 46 must relay the packets of the voice connection ahead of lower priority packets that are being transmitted through the established connections via the router 46. The newly introduced voice connection may cause congestion and may increase the probability of dropped packets at the router 46. In addition, the conventional routing technique inefficiently utilizes the connectivity resources of the system 10, since the high priority connection is routed through the less preferred path, while the optimal path for the high priority connection is occupied by the lower priority connections.

What is needed is a communications system and a method that can efficiently utilize the connectivity resources of the system to provide the best possible paths for connections according to the priority status of the connections, regardless of the order that the connections were established.

SUMMARY OF THE INVENTION

In accordance with the present invention, a network node and a method of dynamically reconfiguring routes of established connections in a communications system operate to provide the optimal path for a new connection based on a priority status of the new connection. The optimal path is provided even when a communication link along the optimal path does not have a sufficient amount of available bandwidth to accommodate the new connection. The network node operates in conjunction with other network nodes in the system to reroute one or more established connections that have reserved bandwidth on a communication link on the optimal route and have a lower priority status than the new connection, thereby increasing the available bandwidth on the communication link to accommodate the new connection. The network node also performs conventional functions of a router. Therefore, the network node will be referred to as an "enhanced router." The enhanced router and the method can be implemented in any communications system in which information is transmitted in packets, blocks, frames or cells (collectively referred herein as "packets").

In the preferred embodiment, the enhanced router operates to monitor the status of communication links in the system by exchanging the status information with other network nodes. The link status includes the available bandwidth on the communication links and the priority status of each presently established connection that is routed through at least one of the communication links. Preferably, every network node in the system is an enhanced router. A network monitor within the enhanced router keeps track of the link status of communication links that are coupled to the enhanced router by recording information regarding new connections that have been routed by the enhanced router and regarding termination of established connections that had been routed through the enhanced router. The network monitor shares the link status information with network monitors of other enhanced routers throughout the system to monitor the current status of every communication link. The link status information is utilized by the enhanced routers to perform the rerouting operation.

When a request signal for a new connection is received at the enhanced router from an associated network, such as a local area network (LAN), a central processing unit (CPU) of the enhanced router computes the optimal path for the new connection using a routing protocol that is stored in memory. The request signal includes information regarding the required bandwidth for the new connection and the priority status of the new connection. The CPU determines the priority status of the new connection by utilizing a prioritization protocol that is also stored in memory. The enhanced router associated with the originating network of the new connection will be referred to as the "source enhanced router." The enhanced router associated with the terminating network of the new connections will be referred to as the "destination enhanced router." The optimal path is the best course from the source enhanced router to the destination enhanced router through one or more communication links in accordance with prescribed routing parameters. The routing parameters may include the number of hops, the amount of toll charge associated with the path, and the distance between the two connecting enhanced routers.

Using the link status information provided by the network monitor, the CPU of the source enhanced router determines whether a sufficient amount of available bandwidth exists on each communication link on the optimal route to accommodate the new connection. If a particular communication link on the optimal route does not have the sufficient amount of available bandwidth, the CPU determines whether there are established connections having a lower priority status than the new connection. The particular communication link will be referred to as the "target link" for clarity. If there are established connections having a lower priority status, the CPU determines whether removing one or more of these established connections from the target link will increase the available bandwidth on the target link sufficiently to accommodate the new connection.

After a positive determination that removing one of more of the established connections will accommodate the new connection, the source enhanced router operates to reroute one of the established connections through an alternate path to bypass the target link. In one embodiment, a reroute-signal generator of the source enhanced router transmits reroute signals to the end enhanced routers, i.e., the source and destination enhanced routers of the established connection that is to be rerouted. The end enhanced routers then transmit acknowledgment signals to the source enhanced router for confirmation, utilizing their respective reroute-signal generators. Next, one of the end enhanced routers, e.g., the destination enhanced router of the established connection, transmits reservation signals using a reservation unit to every enhanced router on the alternate path to reserve bandwidth on all of the communication links on the alternate path. The end enhanced routers then terminate the established connection and re-establish the established connection through the alternate path, bypassing the target link. In a situation where the source enhanced router of the new connection is also one of the end enhanced routers, the source enhanced router will perform the functions that are associated with the source enhanced router and the end enhanced router.

In another embodiment, the source enhanced routers transmit the reroute signals to the enhanced routers that are located at the ends of the target link. These enhanced routers will be referred to as the Atarget routers. A The target routers then transmit acknowledgment signals to the source enhanced router in response to the reroute signals. In this embodiment, the target routers operate to redirect a portion of the established connection that is routed through the target link. This is accomplished by rerouting that portion through a secondary path from one target router to the other target router that bypasses the target link. Initially, one of the target routers transmits one or more reservation signals to the enhanced routers on the secondary path to reserve bandwidth on the communication links on the secondary path. Next, the portion of the established connection through the target link is terminated and connected through the secondary path. In a situation in which the source enhanced router is also one of the target routers, the source enhanced router will perform the functions that are associated with the source enhanced router and the target router.

The above procedure for removing an established connection from the target link may be repeated to remove additional established connections, if necessary, to increase the available bandwidth on the target link to accommodate the new connection. In addition, the entire process for removing one or more established connections from the target link may be repeated for other communication links on the optimal path, if necessary.

After all of the communication links on the optimal path have been prepared for the new connection, the source enhanced routers transmit reservation signals to every enhanced router on the optimal path to reserve bandwidth on the communication links on the optimal path for the new connection. Lastly, the new connection is established through the optimal path.

DETAILED DESCRIPTION

Figure 1:
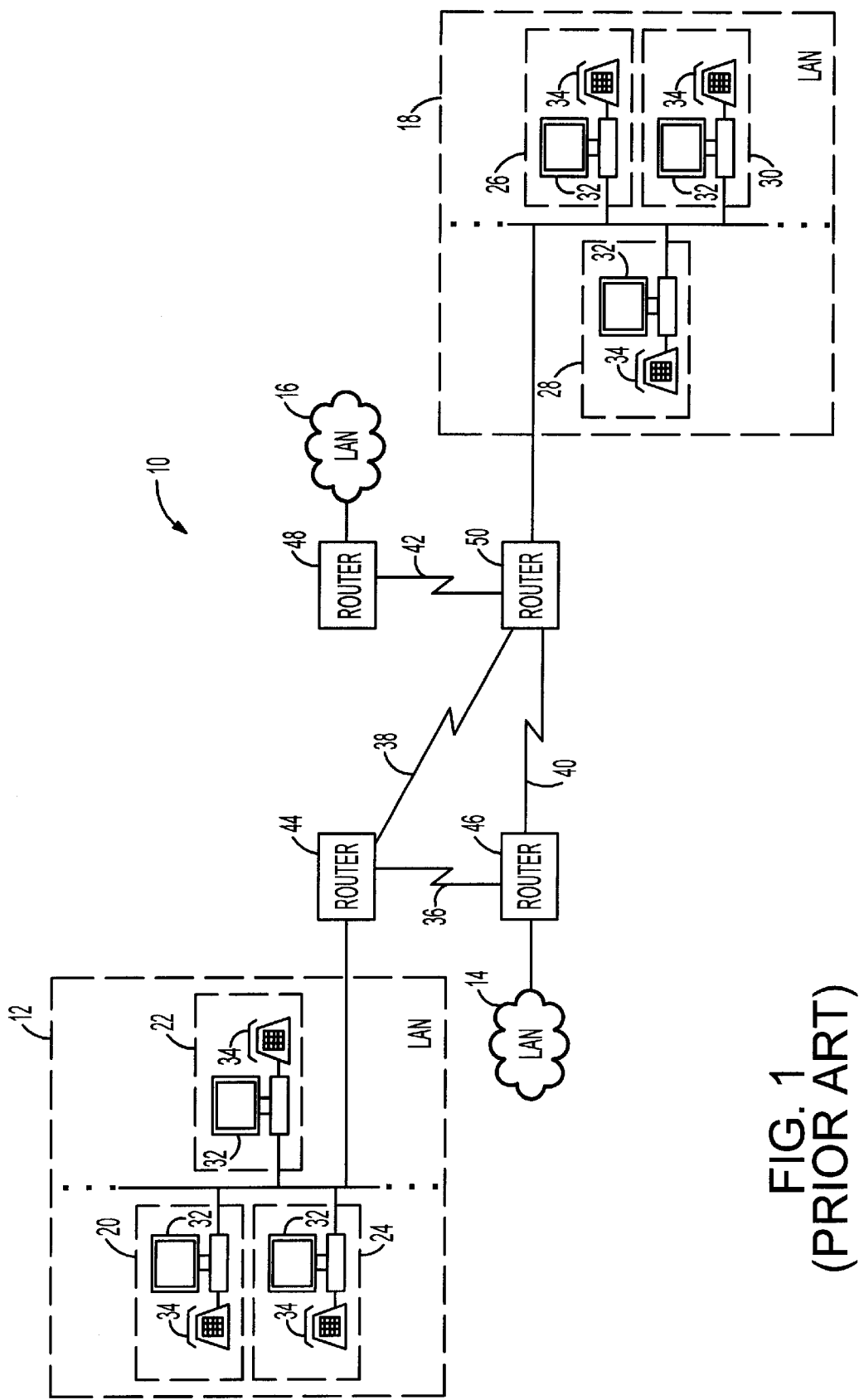
FIG. 1 is a schematic illustration of a prior art communications system with conventional routers.
Figure 2:
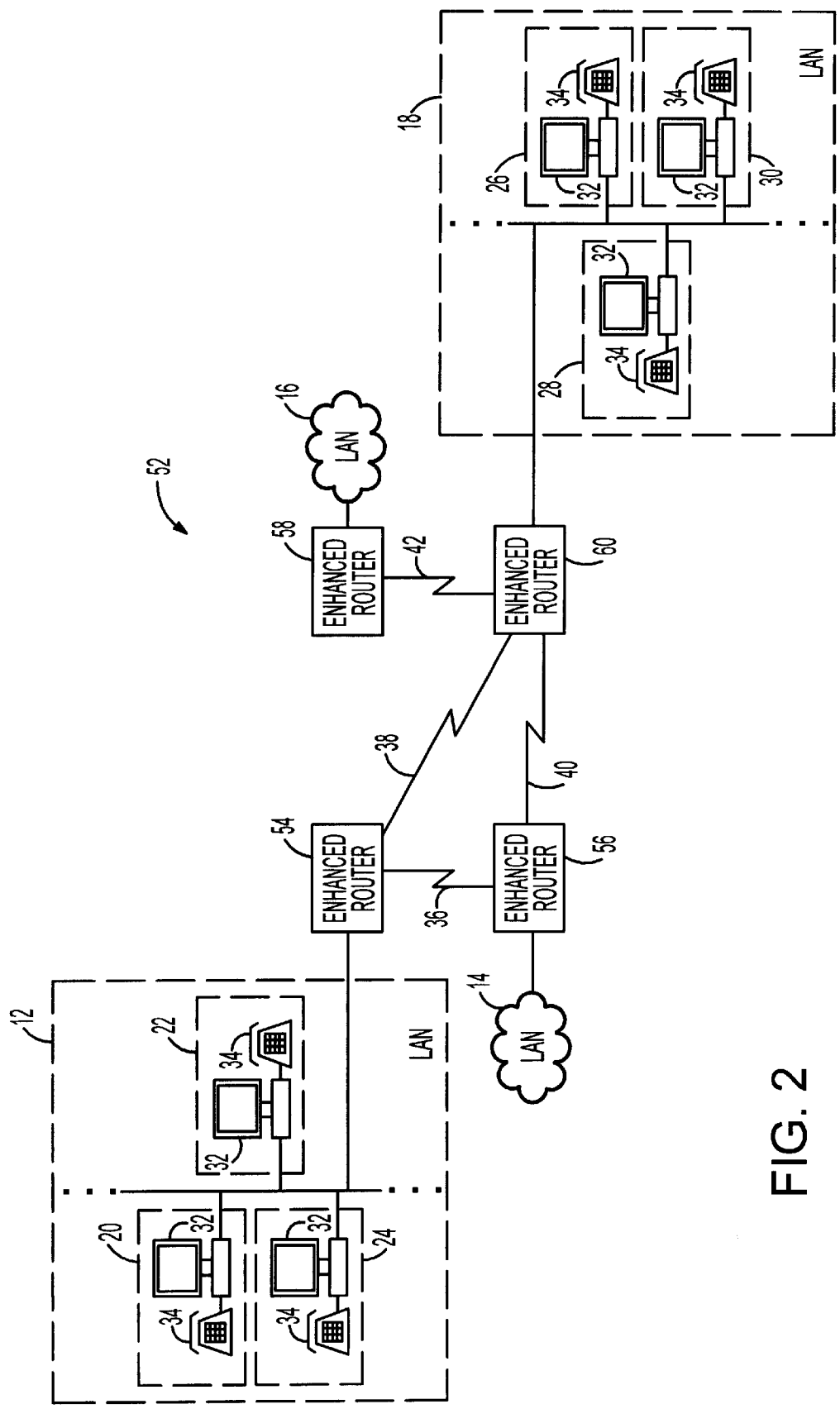
FIG. 2 is a schematic illustration of a communications system with enhanced routers in accordance with the present invention.

With reference to FIG. 2, a communications system 52 in accordance with the present invention is shown. When applicable, the reference numerals of FIG. 1 will be used for the same components depicted in FIG. 2. The communications system 52 includes the networks 12, 14, 16 and 18. The networks 12–18 may be conventional networks, such as LANs, WANs or MANs. In addition, the networks 12–18 may be of a single type of network or a combination of one or more different types of networks.

Each LAN 12–18 can support a number of sites, such as the sites 20, 22 and 24 or the sites 26, 28 and 30. For simplification, only the LANs 12 and 18 are shown with sites. Each site 20–30 may include a computer 32 and/or a telephone 34 that provide a means to communicate with other sites in the communications system 52. The LANs 12, 14, 16 and 18 are associated with enhanced routers 54, 56, 58 and 60, respectively. The enhanced routers 54–60 are interconnected by the communication links 36, 38, 40 and 42. The communication links 36–42 may be in a form of physical communications links, such as fiber optic cables, or in a form of wireless communications links.

The enhanced routers 54–60 operate to route a new high priority connection through an optimal path, even when bandwidth of a communication link on the optimal path has been depleted by established connections. The enhanced routers 54–60 provide the optimal route for the high priority connection by rerouting one or more of the established connections having a lower priority through a less preferred path. The rerouting of established connections increases the available bandwidth on the communication link, thereby allowing the high priority connection to be made through the optimal path.

Figure 3:
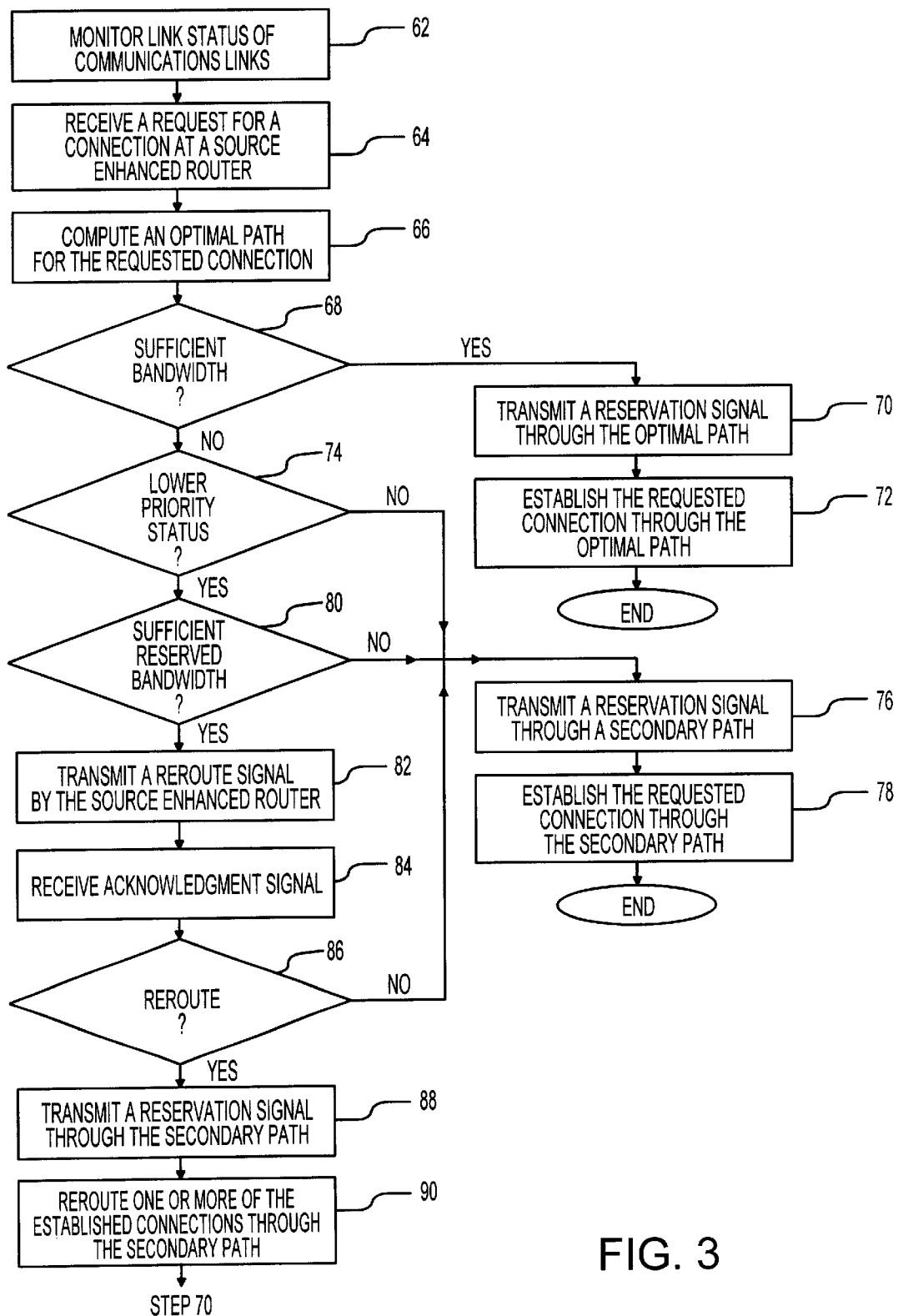
FIG. 3 is a flow diagram of a method of dynamically reconfiguring established connections in the system of FIG. 2 in accordance with the present invention.

The rerouting operation of the enhanced routers 54–60 will be described with reference to FIG. 3. FIG. 3 is a flow diagram of a method for dynamically reconfiguring established connections in the communications system of FIG. 2. For simplification, the primary focus of the description will be network connections made between the LANs 12 and 18. The optimal path for the connections is assumed to be the path provided by the communication link 38 that connects the enhanced routers 54 and 60. This optimal path may be computed by one of the enhanced routers 54 and 60 when such connection is being initiated using one or more routing parameters. The routing parameters may include the number of hops, the toll charge associated with the path, and the distance between two connecting enhanced routers.

Initially, at step 62, the status of each communication link 36–42 is monitored by the enhanced routers 54–60. The link status includes the available bandwidth on the communication links 36–42 and the priority status of any established connections through the communication links 36–42. The link status may also include the operational state of the communication links 36–42. Each enhanced router 54–60 is able to monitor the status of the adjacent communication links 36–42 by keeping track of information regarding the status of the adjacent communication links. For example, the enhanced router 54 will be able to monitor the status of the communication links 36 and 38 by keeping track of new connections that are established by the enhanced router 54 and terminated connections that had been routed through the enhanced router 54. The information attained by each enhanced router 36–42 is disseminated among the enhanced routers to continually monitor the current status of the communication links 36–42.

At step 64, a request for a connection from an originating site from the LAN 12 is received by the enhanced router 54. For example, the enhanced router 54 may receive the request from the site 20 of the LAN 12, seeking a connection to the site 26 of the LAN 18. The request may include information regarding the required bandwidth for the connection and the priority status of the connection. Next, at step 66, the enhanced router 54 computes the optimal path for the requested connection, using the prescribed routing parameters. As stated above, the optimal path from the LAN 12 to the LAN 18 is through the communication link 38. At step 68, the enhanced router 54 determines whether the communication link 38 has a sufficient amount of remaining bandwidth to accommodate the requested connection. If so, at step 70, the enhanced router 54 transmits a reservation signal to the enhanced router 60 in order to reserve bandwidth on the communication link 38 to accommodate the requested connection. At the following step 72, the requested connection is established through the optimal path via the communication link 38. The reservation of bandwidth through the communication link 38 ensures that packets for the new connection can be routed through the communication link 38, even when packet traffic increases on the communication link 38.

However, if the enhanced router 54 determines that the communication link 38 does not have the sufficient amount of remaining bandwidth at step 68, the process proceeds to step 74. At step 74, the enhanced router 54 compares the priority status of the requested connection with the priority status of established connections that have reserved bandwidth on the communication link 38 to determine whether any established connection has a lower priority status than the requested connection. The priority status may include a number of levels. The number of levels for the priority status is not critical to the invention. If there is no established connection having a lower priority status than the requested connection, the process proceeds to step 76. At step 76, the enhanced router 54 transmits reservation signals through a secondary path, the less preferred path. The secondary path from the enhanced router 54 to the enhanced router 60 is through the communication links 36 and 40 via the enhanced router 56. The reservation signals are directed to the enhanced routers 56 and 60 to reserve bandwidth on the communication links 36 and 40. Next, at step 78, the requested connection is established through the secondary path via the communication links 36 and 40.

On the other hand, if an established connection with a lower priority status than the requested connection does exist, the process proceeds to step 80. At step 80, the enhanced router 54 determines whether the amount of bandwidth that has been reserved by one or more lower priority connections, when added to the remaining bandwidth on the communication link 38, is sufficient to accommodate the requested connection. If the answer is negative, the process proceeds to step 76. If the answer is positive, a reroute signal with a protocol element R is transmitted to the enhanced router 60 by the enhanced router 54, at step 82, seeking authorization to reroute one or more of the lower priority connections through the secondary route.

At step 84, the enhance router 54 receives an acknowledgment signal from the enhanced router 60 in response to the reroute signal. Next, at step 86, the enhanced router 54 reads the acknowledgment signal to determine whether the enhanced router 60 has approved the request to reroute. If the acknowledgment signal indicates that the reroute is not authorized, the process proceeds to step 76. However, if authorized, reservation signals are transmitted by the enhanced router 54 through the secondary path, at step 88. The signals are directed to the enhanced routers 56 and 60 to reserve bandwidth through the communication links 36 and 40 to accommodate the lower priority connections that are to be rerouted. Next, at step 90, one or more of the lower priority connections are rerouted through the secondary route. The amount of bandwidth reserved at step 78 will vary depending upon the required bandwidth to accommodate the rerouted lower priority connections. The process then proceeds to step 70 to establish the requested connection through the optimal path.

Figure 4:
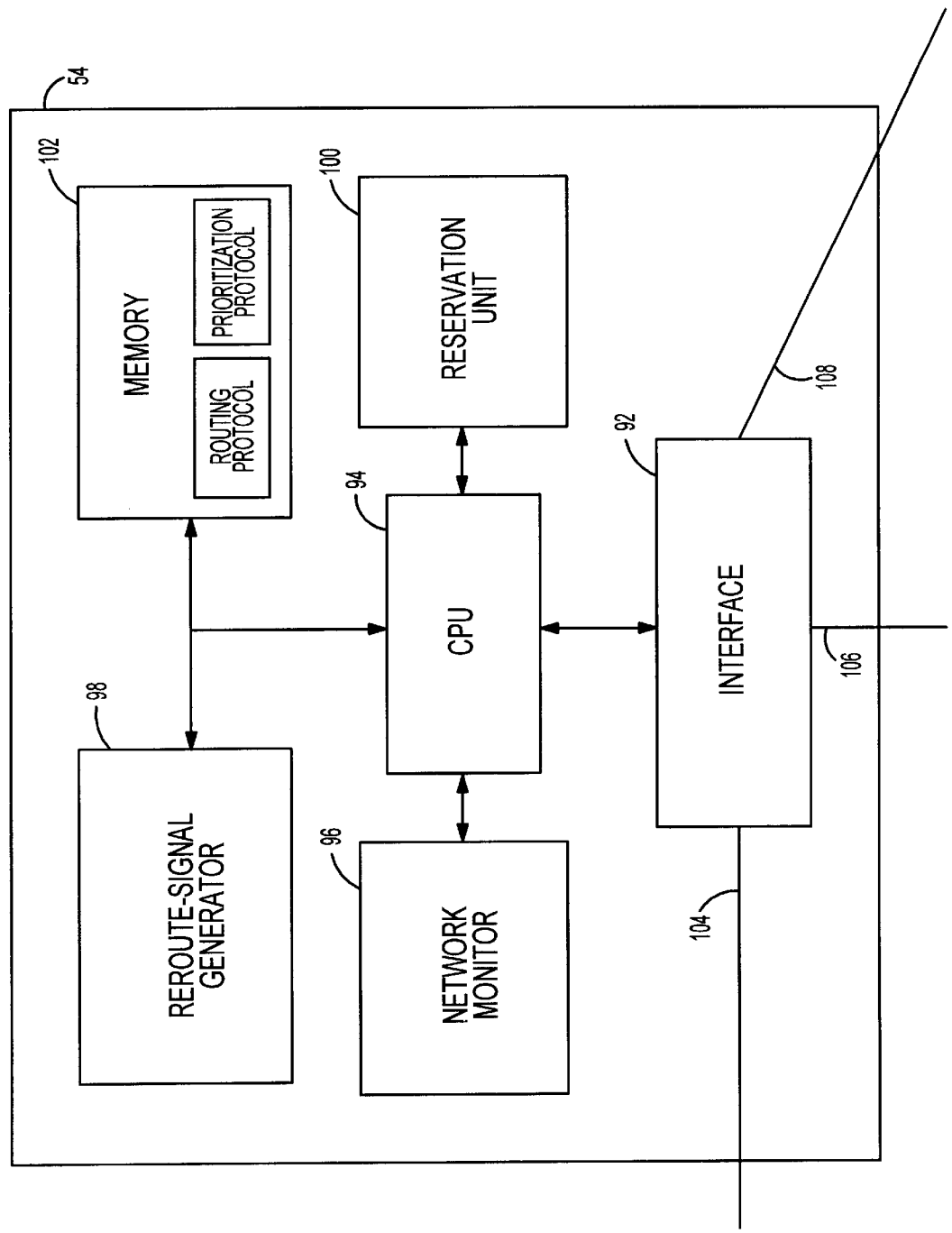
FIG. 4 is a block diagram of the enhanced router in accordance with the present invention.

Turning to FIG. 4, components of the enhanced router 54 are shown. Since the enhanced routers 54–60 are identical, the enhanced router 54 is representative of the other enhanced routers 56, 58 and 60. The enhanced router 54 includes an interface 92, a central processing unit (CPU) 94, a network monitor 96, a reroute-signal generator 98, a reservation unit 100, and memory 102. These components of the enhanced router 54 operate in conjunction with components of the other enhanced routers 56, 58 and 60 to manipulate connections throughout the system 52 in order to ensure optimal connectivity between the LANs 12–18.

The interface 92 includes input/output (I/O) terminals 104, 106 and 108. The interface 92 may include additional I/O terminals, depending on the network topology. The number of I/O terminals is not critical. The I/O terminal 104 is communicatively coupled to the LAN 12. The I/O terminal 106 is coupled to the communication link 36, while the I/O terminal 108 is coupled to the communication link 38. The interface 92 allows the enhanced router 54 to relay packets of information to and from the LAN 12 and the routers 56 and 60.

The CPU 94 is coupled to the interface 92 to process packets that are being relayed by the enhanced router 54. The CPU 94 is also coupled to the network monitor 96, the reroute-signal generator 98, the reservation unit 100 and memory 102. The CPU 94 operates with components 96–102 of the enhanced router 54 to perform a number of operations. When a request for a new connection is received by the interface 92, the CPU 94 determines the priority status of the new connection by utilizing a prioritization protocol stored in memory 102. Various factors may be taken into account to determine the priority status of the new connection, such as the type of connection, the originating site, the destination site, and the required bandwidth. In addition, the CPU 94 determines the optimal route utilizing a routing protocol, also stored in memory, along with information provided by the network monitor 96. The routing protocol may utilize one or more of the routing parameters that were listed in reference to FIG. 3.

The network monitor 96 keeps track of the status of the communication links 36–42 by recording information regarding new connections that are made through the enhanced router 54 and termination of established connections that had been routed through the enhanced router 54. The network monitor 96 shares this information with other network monitors of the enhanced routers 56–60 to monitor the current status of the communication links 36–42. The sharing of link status information may involve periodically transmitting an update signal among the enhanced routers 56–60. The manner in which network nodes share information is known in the art. This information is utilized by the CPU 94 to make decisions during a new connection set-up. The information concerning remaining bandwidth on the communication link 38 may be utilized by the CPU 94 to determine whether the new connection may be routed through the communication link 38 without the need to redirect established connections that have been routed through the communication link 38. In addition, the information concerning the priority status of the established connections through the communication link 38 may be utilized by the CPU 94 to determine whether any established connection has a lower priority status than the new connection that is in the process of being routed. Furthermore, the information concerning bandwidth reserved by the lower priority connection may be utilized by the CPU 94 to determine whether the communication link 38 can accommodate the new connection, if one or more of the lower priority connections are rerouted through an alternate path, bypassing the communication link 38.

The reroute-signal generator 98 provides the reroute signals that are used by the enhanced router 54 to request rerouting of certain established connections. In addition, the reroute-signal generator 98 provides the acknowledgment signals that are transmitted in response to a reroute signal from another enhanced router. The reservation unit 100 generates the reservation signals that are used to reserve bandwidth on selected communication links. The reroute signals, the acknowledgment signals and the reservation signals are transmitted to appropriate destinations by the CPU 94.

In one embodiment, the network monitor 96, the reroute-signal generator 98 and the reservation unit 100 are separate devices that include solely hardware to perform their respective functions. In another embodiment, these devices include firmware, in addition to hardware, to perform their respective functions. In the preferred embodiment, these devices are embodied in an algorithm executed by the CPU 94.

Figure 5:
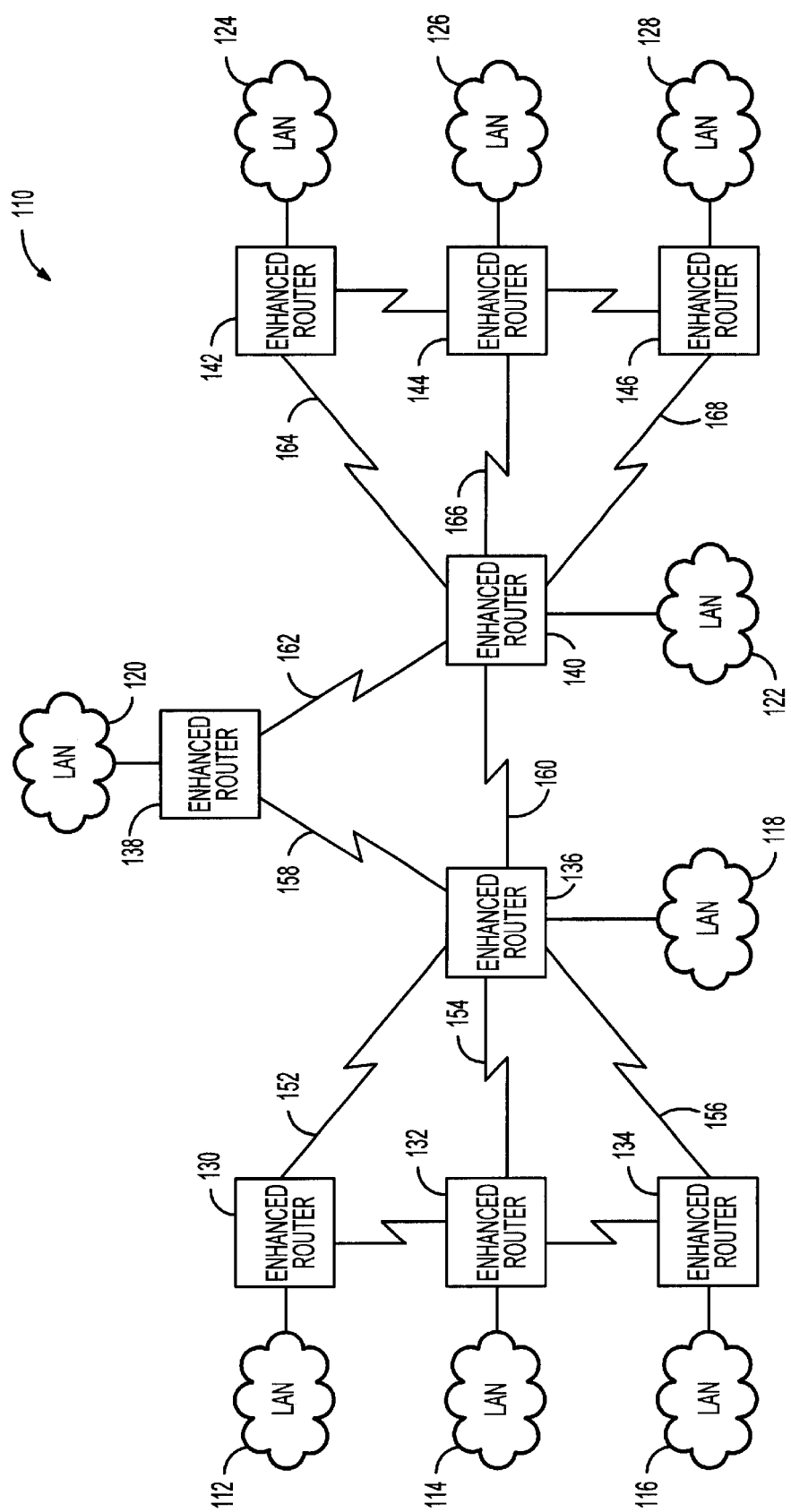
FIG. 5 is a schematic illustration of a complex communications system with enhanced routers in accordance with the present invention.

The enhanced routers, such as the enhanced router 54, may be implemented in a more complex communications system than the system 52 of FIG. 2. In FIG. 5, a communications system 110 that includes LANs 112–128 is shown. The LANs 112, 114, 116,118, 120, 122, 124, 126 and 128 are associated with enhanced routers 130, 132,134, 136, 138, 140, 142, 144 and 146, respectively. The enhance routers 130–146 are interconnected by communication links 152, 154, 156, 158,160, 162, 164, 166 and 168.

The rerouting operation performed by the enhance routers 130–146 to connect a high priority connection through an optimal route is similar to the rerouting operation performed by the enhanced routers 54–60 of FIG. 2. The difference is that an optimal path for a connection in the system 110 may include more communication links. Therefore, additional communication links may be required to be examined by the enhanced routers 130–146 during a new connection set-up.

The rerouting operation performed by the enhanced routers 130–146 will be described with an example of a high priority connection being initiated from the LAN 112 to the LAN 124. The high priority connection to be made requires 10% of the bandwidth capacity of the communication link 160. In this example, there is a sufficient amount of remaining bandwidth on the communication links 152 and 164. However, 95% of bandwidth available on the communication link 160 has been reserved by established connections between various networks.

Initially, a request signal for the new connection is received by the associated enhanced router 130 from the LAN 112. The enhanced router 130 computes the optimal path in response to the request signal, using the routing protocol. The optimal path will be assumed to be through the communication links 152, 160 and 164. Since the communication link 160 cannot accommodate the new connection, the enhanced router 130 examines the established connections that have reserved bandwidth on the communication link 160. If there are established connections that have a lower priority status than the requested connection, one or more of these established connections are selected to be rerouted. The number of lower priority connections that are selected to be rerouted will depend on the required bandwidth of the new connection and the amount of bandwidth reserved by each of the lower priority connections. Assuming that a lower priority connection between the enhanced routers 132 and 144 has reserved 7% of the bandwidth capacity of the communication link 160, this connection may be selected by the enhanced router 130 to be rerouted.

After the enhanced router 130 has selected the lower priority connection to be rerouted, the enhanced router 130 transmits reroute signals to appropriate enhanced routers. In one embodiment, the reroute signals are transmitted to the enhanced routers 136 and 140. The enhanced routers 136 and 140 then transmit acknowledgment signals to the enhanced router 130 in response to the reroute signals. In this embodiment, the enhanced routers 136 and 140 operate in conjunction to reroute a portion of the path of the selected lower priority connection, i.e., from the enhanced router 136 to the enhanced router 140, through the enhanced router 138 via the communication links 158 and 162. The rerouting may involve one of the enhanced routers 136 and 140 sending a reservation signal to the enhanced router 138 to reserve bandwidth on the communication links 158 and 162. After the reservation is made, the enhanced routers 136 and 140 establish the selected lower priority connection through the enhanced router 138.

In another embodiment, the enhanced router 130 transmits the reroute signals to the end enhanced routers of the selected lower priority connection, i.e., the enhanced routers 132 and 144. The enhanced routers 132 and 144 then transmit acknowledgment signal to the enhanced router 130 in response to the reroute signals. Next, the enhanced routers 132 and 144 terminate the selected lower priority connection and then re-establish the connection through the enhanced router 138, bypassing the communication link 160. For example, one of the enhanced routers 132 and 144 may reserve bandwidth on the communication links 154, 158, 162 and 166. After the reservations, the terminated connection is re-established through the reserved communication links 154, 158, 162 and 166.

After the selected lower priority connection has been rerouted, the enhanced router 130 transmits reservation signals to the enhanced routers 136, 140 and 142 to reserve sufficient bandwidth on the communication links 152, 160 and 164 to accommodate the new connection. Once the communication links 152, 160 and 164 have been reserved, the new high priority connection is established through the optimal route.

This process of rerouting selected lower priority connections to increase available bandwidth on a particular communication link can be repeated on other communication links on the optimal path, when required. Therefore, in the above example, if the available bandwidth on the communication link 152 was not sufficient to accommodate the new high priority connection, the above-described rerouting procedure would have been performed with respect to the communication link 152 to reroute one or more lower priority connections that have reserved bandwidth on the communication link 152. The rerouting procedure ensures that high priority connections, such as voice connections, will be routed through an optimal path, even when communication links on the optimal path have been reserved by established lower priority connections.

In situations in which the enhanced router that is initiating the new connection is also one of the enhanced routers that is directly involved in the rerouting of an established connection, that enhanced router will perform the functions that are associated with both of the enhanced routers.

What is claimed is:

1. A method of dynamically reallocating connectivity resources in a communications system comprising steps of:
   receiving a request to establish a new connection for a call from a source node to a destination node, said call having a first priority status;
   computing a primary path for said new connection using a prescribed criterion;
   identifying an established connection of an ongoing call that is routed through a communication link on said primary path that does not have sufficient available bandwidth to accommodate said new connection, said identifying being for enabling rerouting of said established connection from said communication link to a new path so that said request to establish said new connection can be routed through said communication link on said primary path;
   rerouting said established connection of said ongoing call that had been routed through said communication link such that said established connection is rerouted to said new path that bypasses said communication link, said ongoing call of said established connection having a lower priority status than said new connection; and
   establishing said new connection through said primary path via said communication link, thereby enabling said call.

2. The method of claim 1 wherein said step of rerouting said ongoing call of said established connection includes re-establishing said ongoing call through said new path and terminating said established connection.

3. The method of claim 2 further comprising a step of transmitting a reservation signal to a node on said new path to reserve bandwidth across at least one communication link on said new path, prior to said step of rerouting said ongoing call.

4. The method of claim 1 wherein said step of rerouting said ongoing call of said established connection includes breaking a portion of said established connection that had been routed through said communication link and reconnecting said portion through at least one alternate communication link such that said communication link is bypassed by connectivity for said ongoing call.

5. The method of claim 1 further comprising a step of transmitting a reroute signal from said source node to a node associated with said established connection to reroute said ongoing call.

6. The method of claim 5 further comprising a step of receiving at said source node an acknowledgment signal from said node in response to said reroute signal.

7. The method of claim 1 further comprising a step of reserving bandwidth on said communication link to accommodate said new connection, prior to said step of establishing said new connection through said primary path.

8. A network node in a communications system comprising:
- interfacing means for receiving and transmitting data;
- processing means operatively associated with said interfacing means for signal processing said data, said processing means being enabled to compute a primary path through said system for a new connection for which routing has been requested, said processing means being configured to compute said primary path for said new connection using a prescribed criterion;
- monitoring means operatively associated with said processing means for monitoring a status of a communication link on said primary path, said processing means being cooperative with said monitoring means for identifying an established connection of an outgoing call that is currently routed through said communication link, wherein said identifying is a response to determining that available bandwidth on said communication link is insufficient to accommodate said new connection and wherein said identifying is for enabling rerouting of said established connection from said communication link; and
- generating means operatively coupled to said processing means for producing a reroute signal in response to a request signal to route said new connection through said primary path when said identified established connection is switched from said primary path to a secondary path, said generating means being enabled to produce said reroute signal in response to said determining that said available bandwidth on said communication link is insufficient to accommodate said new connection;
- wherein said generating means is cooperative with said processing means and said monitoring means to reroute at least one said established connection from said primary path to said secondary path and to establish said new connection along said primary path in response to detecting a combination of conditions that include all of:
  (1) receiving said request signal to route said new connection through said primary path;
  (2) insufficient currently available bandwidth to accommodate said new connection on said communication link of said primary path; and
  (3) a capability to increase said available bandwidth on said primary path sufficiently to accommodate said new connection by rerouting said at least one established connection from said primary path to said secondary path.

9. The node of claim 8 further comprising memory that is operatively associated with said processing means and said generating means, said memory containing a prioritization protocol that is utilized by said processing means to determine a priority status of said new connection.

10. The node of claim 9 wherein said prioritization protocol is enabled to identify whether said new connection is a voice data connection to determine said priority status of said new connection.

11. The node of claim 8 further comprising a reservation device coupled to said processing means, said reservation device being enabled to generate a reservation signal to reserve bandwidth on an associated communication link, when requested by said processing means.

* * * * *